United States Patent
Bricourt

(10) Patent No.: US 6,496,604 B1
(45) Date of Patent: Dec. 17, 2002

(54) METHOD FOR PROCESSING A NOISY DIGITAL IMAGE SOURCE SEQUENCE

(75) Inventor: Ricardo Bricourt, Paris (FR)

(73) Assignee: Key Concept, Paris (FR)

( * ) Notice: Subject to any disclaimer, the term of this patent is extended or adjusted under 35 U.S.C. 154(b) by 0 days.

(21) Appl. No.: 09/000,124

(22) PCT Filed: Jul. 3, 1996

(86) PCT No.: PCT/FR96/01033

§ 371 (c)(1),
(2), (4) Date: Sep. 4, 1998

(87) PCT Pub. No.: WO97/03414

PCT Pub. Date: Jan. 30, 1997

(30) Foreign Application Priority Data

Jul. 11, 1995 (FR) .......................................... 95 08632

(51) Int. Cl.$^7$ ............................. G06K 9/40; G06T 5/20; G06T 5/40; G06T 5/50; H04N 5/21
(52) U.S. Cl. ....................... 382/254; 382/260; 382/262; 382/264; 382/275; 348/241; 348/607
(58) Field of Search ................................ 382/254, 255, 382/260–264, 275, 284; 348/218, 222, 241, 246, 248, 251, 607, 615, 618, 622; 358/447, 448, 463, 450

(56) References Cited

U.S. PATENT DOCUMENTS

| | | | | |
|---|---|---|---|---|
| 5,309,237 A | * | 5/1994 | Singh .......................... | 348/607 |
| 5,550,935 A | * | 8/1996 | Erdem et al. ................ | 382/260 |
| 5,598,226 A | * | 1/1997 | Kokaram ..................... | 348/607 |

FOREIGN PATENT DOCUMENTS

| | | |
|---|---|---|
| EP | 0 550 166 | 7/1993 |
| EP | 0 574 969 | 12/1993 |

OTHER PUBLICATIONS

Nomoura & Naruse, *Reduction of Obscuration Noise Using Multiple Images*, IEEE Transactions on Pattern Analysis and Machine Intelligence, vol. 10, No. 2, Mar. 1988, USA, pp. 267–270.

Kokaram & Rayner, *A System for the Removal of Impulsive Noise in Image Sequences*, Visual Communications and Image Processing '92, vol. 1818, PT 1, Nov. 18–20, 1992, Boston, MA, USA, pp. 322–331.

\* cited by examiner

*Primary Examiner*—Scott Rogers
(74) *Attorney, Agent, or Firm*—Kinney & Lange, P.A.

(57) ABSTRACT

A process for processing a source sequence of damaged digital images, of the type capable of obtaining an output sequence of corrected digital images. According to the invention, the process includes the following main steps, for each damaged digital image in the source sequence: calculation of the three parameters estimating the correction to be made to each pixel in the damaged image, the first parameter particularly being a function of all pixels in the reference image, the second parameter being mainly a function of pixels adjacent to the given pixel, the third parameter being mainly a function of the pixel in the reference image with the same spatial coordinates as the given pixel; calculation of a correction factor for each given pixel in the damaged image, by a combination of the first, second and third parameters; and correction of each given pixel in the damaged image, particularly as a function of the correction factor.

11 Claims, 3 Drawing Sheets

METHOD FOR PROCESSING A NOISY DIGITAL IMAGE SOURCE SEQUENCE

Figure 1:
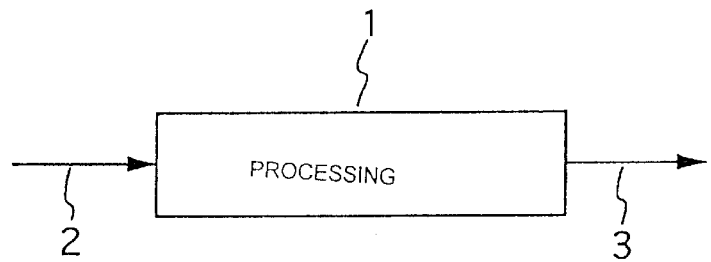

This invention relates to digital images, generated either directly by a digital acquisition system or digitized after their acquisition.

More precisely, the invention relates to a process for processing a source sequence of digital images that have been damaged (i.e. that have high noise) in order to obtain an output sequence of corrected digital images.

In general, the noise that affects digital images results in a degradation of the contrast of these images as a function of the noise intensity and a loss of information in damaged areas of these images.

There are several types of noise, particularly noise due to movement or defocusing of the sensor making the images blurred (motion/focus blur), speckle noise (in the form of spots), or noise due to measurements (additive or multiplication noise).

Therefore, noise effects should be compensated in order to restore a sequence of images with an adequate quality.

There are several known techniques of correcting damaged image sequences, particularly such as inverse filtering or calculating the average of the image sequence.

The known inverse filtering technique consists of applying the inverse transfer function to the damaged image. This assumes that the noise type (or an approximation of the noise type) is known. This is not always the case. Furthermore, this known inverse filtering technique is not very efficient when the noise/signal ratio is high.

In general, the second known technique that consists of calculating the average of the image sequence is not capable of providing sufficient correction to the damaged images.

The known inverse filtering technique has the major disadvantage of being specific to a particular noise type and that it introduces errors when the image sequence contains moving objects. Consequently, it will generate additional information losses when it is used to correct a noise type other than the noise type for which it was designed.

Furthermore, in most of these known techniques, each image in the sequence is corrected in several successive passes, each pass corresponding to a correction filtering, the parameters of which may be modified by an operator (this is referred to as interactive filtering). The time necessary to execute these successive passes makes it impossible to correct the sequence of damaged digital images in real time.

The objective of the invention is to overcome these various disadvantages in the state of the art.

More precisely, one of the objectives of this invention is to provide a process for processing a source sequence of damaged digital images, of the type capable of providing an output sequence of corrected digital images that is independent of the noise type affecting the images in the source sequence.

Another objective of the invention is to provide this type of process capable of processing the source sequence in real time.

Another objective of the invention is to provide a process capable of restoring a source sequence of images representing a panorama (with or without moving objects), and the contrast of these images.

These various objectives, and other objectives that will become apparent later, are achieved according to the invention by means of a process for processing a source sequence of damaged digital images of the type capable of producing an output sequence of corrected digital images, each of the damaged or corrected digital images being described pixel by pixel, each of the said pixels being characterized by an amplitude level among a plurality of possible amplitude levels, characterized by the fact that the said process includes the following main basic steps, for each damaged digital image in the said source sequence:

for all pixels in the damaged image, calculate a first parameter called the global parameter, estimating the correction to be made to each pixel in the damaged image as a function of the said set of pixels in the damaged image and the set of pixels in a reference image, the said reference image being a corrected image resulting from the correction of the image preceding the said damaged image in the said source sequence;

for each given pixel in the damaged image, calculate a second parameter called the local parameter, estimating the correction to be made to the said given pixel as a function of the given pixel and other pixels called neighboring pixels, located within a predetermined vicinity of the said given pixel;

for each given pixel in the damaged image, calculate a third parameter called the temporal parameter, estimating the correction to be made to the said given pixel as a function of the said given pixel and the pixel in the reference image with the same spatial coordinates as the said given pixel;

for each given pixel in the damaged image, calculate a correction factor by combining the said first, second and third estimating parameters associated with the said given pixel;

correct each given pixel in the damaged image using a predetermined correction strategy, in order to obtain the pixel corresponding to the corrected image in the output sequence as a function of the correction factor associated with the said given pixel, the given pixel in the damaged image and the pixel in the reference image having the same spatial coordinates as the said given pixel.

Thus, the general principle of the invention consists of processing each of the damaged images forming the source sequence. Each pixel in each damaged image is corrected as a function of a correction factor associated with it and which is determined by combining three distinct parameters (the global, local and temporal parameters respectively) estimating the correction to be made to the pixel.

Due to this combination of three parameters, each supplying distinct information about the correction to be made, the process according to the invention is not interactive and all that is necessary is a single processing pass for each damaged image. Furthermore, most calculations can take place in matrix form. Consequently, the process according to the invention is ideal for use in real time.

Furthermore, this combination of three parameters makes the process according to the invention practically independent of the noise type affecting the images in the source sequence. This means that only a limited number of assumptions are necessary about the noise type that affected the images in the source sequence. For example, it is possible to only consider assumptions about how noise is distributed, intermittently. In other words, the process according to the invention can be adapted and is suitable for all types of noise to be compensated.

The first parameter (the global parameter) is common to all pixels in the same damaged image, and provides information about the general quality of this damaged image, by comparison with the previous corrected image (or the reference image).

Beneficially, the said calculation of the first parameter P1 for all pixels in the damaged image can be made using the formula $$P1=K+f_E(H1,H2)$$

where: K is a predetermined offset value;
H1 is a first histogram of the amplitude levels of pixels in the damaged image;
H2 is a second histogram of amplitude levels of pixels in the reference image;
$f_E$ is a predetermined error function used to calculate a variation between two functions.

For example, the predetermined error function may be based on the least squares method. It may also be based on the differences of the variances of histograms for the damaged image and for the reference image.

The predetermined offset value, if it is not equal to zero, prevents the first parameter from being zero when the two histograms are identical (if $f_E$ (H1; H2)=0).

The second parameter (the local parameter) is specific to each pixel in the same damaged image. It provides information about whether there is a spatial discontinuity, by comparing with neighboring pixels in the same damaged image. Noise results in a fairly pronounced spatial discontinuity in the same image. Consequently, detection of this type of spatial discontinuity in a pixel suggests a fairly high probability that the pixel is affected by noise.

Advantageously, the said calculation of the second parameter is done simultaneously for all pixels in the damaged image, and is made using the following formula:

$$\{M_{P2}\}=(1/\alpha_2)\cdot F_2(\{I_t\}-\{I_{t-1}\}$$

where: $\{M_{P2}\}$ is a matrix of second parameters P2 each associated with a distinct pixel of the damaged image;
$\{I_t\}$ is a matrix of the amplitude values of pixels in the damaged image;
$F_2$ is an average or median or low pass filter, or any other filter adapted to the noise being processed;
$\alpha_2$ is a first normalization factor.

It may be possible to use a combination of average, median and low pass filters, instead of using a single filter, in order to combine the advantages of each type of filter.

The third parameter (or the temporal parameter) is specific to each pixel in the same damaged image. It provides information about a change in the amplitude value by comparison with the pixel in the previous corrected image (the reference image) with the same spatial coordinates. Noise also results in a fairly pronounced temporal discontinuity between two successive images. Consequently, detection of this type of temporal discontinuity in a pixel indicates a fairly high probability that this pixel is affected by noise. However, it should be checked that this temporal discontinuity is not due to a moving object between successive images.

Preferably, the said calculation of the third parameter is done simultaneously for all pixels in the damaged image, and is made using the following formula:

$$\{M_{P3}\}=(1/\alpha_3)F_3(\{I_t\}-\{I_{t-1}\})$$

where: $\{M_{P3}\}$ is a matrix of third parameters P3 each associated with a distinct pixel of the damaged image;
$\{I_t\}$ is a matrix of the amplitude values of pixels in the damaged image;
$\{I_{t-1}\}$ is a matrix of the amplitude values of pixels in the reference image;
$F_3$ is an average or median or low pass filter,
$\alpha_3$ is a second normalization factor.

Filtering makes it possible to ignore changes in values of the pixel amplitude due to object movements between successive images.

Preferably, the said calculation of the correction factor will be made using the following formula:

$$C=\max\{I,\ P_1\cdot f_c(P2,P3)\}$$

where: P1, P2 and P3 are the said first, second and third parameters normalized to 1;
$f_c$ is a predetermined combination function.

Beneficially, the said predetermined correction strategy consists of calculating an amplitude value of the corrected pixel $I'_t(x, y)$, for each given pixel in the damaged image, using the following formula:

$$I'_t(x,\ y)=R_1(C)\cdot I_t(x,\ y)+R_2(C)\cdot I_{t-1}(x,\ y)$$

where: $I_t(x, y)$ is the amplitude value of the given pixel in the damaged image;
$I_{t-1}(x, y)$ is the amplitude of the pixel in the reference image with the same spatial coordinates (x, y) as the given pixel;
C is the correction factor normalized to 1;
$R_1$ and $R_2$ are distribution functions respecting two constraints, namely:
$R_1(C)+R_2(C) \leq 1$, where $R_1$ is a decreasing function such that $R_1(0)=1$, and $R_2$ is an increasing function such that $R_2(1)=1$.

Thus, the following three cases may be distinguished:
if C=0, the amplitude of the corrected pixel is equal to the amplitude value of the pixel in the damaged image (no replacement);
if C=1, the amplitude of the corrected pixel is equal to the amplitude value of the pixel in the reference image (complete replacement);
if 0<C<1, the amplitude value of the corrected pixel is equal to a weighted sum of the amplitudes of the pixel in the damaged image and the pixel in the reference image (weighted replacement).

According to one beneficial variant, the said predetermined correction strategy consists of calculating an amplitude value of the corrected pixel $I_t''(x, y)$, for each given pixel in the damaged image, using the following formula:

$$I_t''(x,\ y)=R_1(C)\cdot I_t(x,\ y)+R_2(C)\cdot I_{t-1}(x,\ y)+R_3(C)\cdot I_{t,F}(x,\ y)$$

where: $I_t''(x, y)$ is the amplitude of the given pixel in the damaged image;
$I_{t-1}(x, y)$ is the amplitude value of the pixel in the reference image with the same spatial coordinates (x, y) as the given pixel;
$I_{t,F}(x, y)$ is the amplitude value of the pixel in a filtered image with the same spatial coordinates (x, y) as the given pixel, the said filtered image being obtained by an average or median or low pass filter or any other filter adapted to the noise treated in the damaged image;
C is the correction factor normalized to 1;
$R_1$, $R_2$ and $R_3$ are distribution functions respecting the constraints $R_1(C)+R_2(C)+R_3(C) \leq 1$, where $R_1$ is a decreasing function such that $R_1(0)=1$, and $R_2$ is an increasing function such that $R_2(1)=1$.

Preferably, for each given pixel in the damaged image, the said process includes the following additional basic steps:

calculate an error probability on the amplitude value of the given pixel, as a function of the variation between the number of pixels in the damaged image and the number of pixels in the reference image with the same amplitude value as the said given pixel, the said error probability consisting of a fourth parameter estimating the correction to be made to the said given pixel;

use of the said fourth parameter to weight the first and second parameters or the correction factor associated with the said given pixel.

These two additional steps refine the calculation of the correction factor.

In one preferred embodiment of the invention, the said process comprises the following preliminary basic steps:

calculate a first histogram of the amplitude values of pixels in the damaged image;

calculate a second histogram of the amplitudes of pixels in the reference image;

calculate the variation between the average values of the said first and second histograms, correct the amplitude values of the pixels in the damaged image as a function of the said variation of the average value, in order to balance the amplitude values of the pixels in the damaged image with the amplitude values of the pixels in the reference image and obtain a precorrected damaged image that is used instead of the damaged image in all the other steps of the said process.

These preliminary steps correspond to use of a gain correction on amplitude values of the damaged image as a function of the amplitude values of the reference image.

In one beneficial variant of the process according to the invention in which a consistent type process is used, the following steps are carried out for each damaged digital image in the source sequence (consisting of a level n digital image to be corrected):

reduce the size of the level n digital image to be corrected, in order to obtain a level n+k digital image to be corrected, where k≧1;

process the level n+k digital image to be corrected at hierarchical level n+k, in order to obtain a corrected level n+k digital image;

increase the size of the corrected level n+k digital image in order to obtain a corrected level n+k−1 digital image;

reiterate the two previous steps of processing and increasing the size, if necessary, until a level n corrected digital image is obtained;

if necessary, processing of the corrected level n digital image at hierarchical level n, the process according to the invention being characterized by the fact that at least one of the said processing steps at a given hierarchical level consists of using the said basic steps at least once.

The principle of this processing hierarchization (or processing at several levels) is to reduce the size of the image to be processed in order to be able to apply processing requiring more time or calculation power.

Thus, processing of each damaged digital image in the source sequence is refined and improved. For each hierarchical level, the processing may consist of carrying out the above mentioned basic steps (namely the steps of calculating the various parameters and the correction factor, and then the correction itself) one or more times, and/or applying several filters (for example of the average, median or low pass type).

Preferably, at least one of the said first, second, third and fourth parameters is weighted as a function of the hierarchical processing level that at least partially forms the said basic steps.

Movements of large objects can thus be kept. Note that a level n image (for example n=0), is fairly sensitive to moving objects, whereas a higher level image (for example N+2) is less sensitive since movements are smaller. In order to maintain movements of large objects, it is preferable that the effects of some parameters (for example the temporal parameter) are reduced for higher level processing, and/or the effects of other parameters (for example the local parameter) are given priority.

Beneficially, the process according to the invention applies to the real time processing of a source sequence of damaged digital images.

Figure 2:
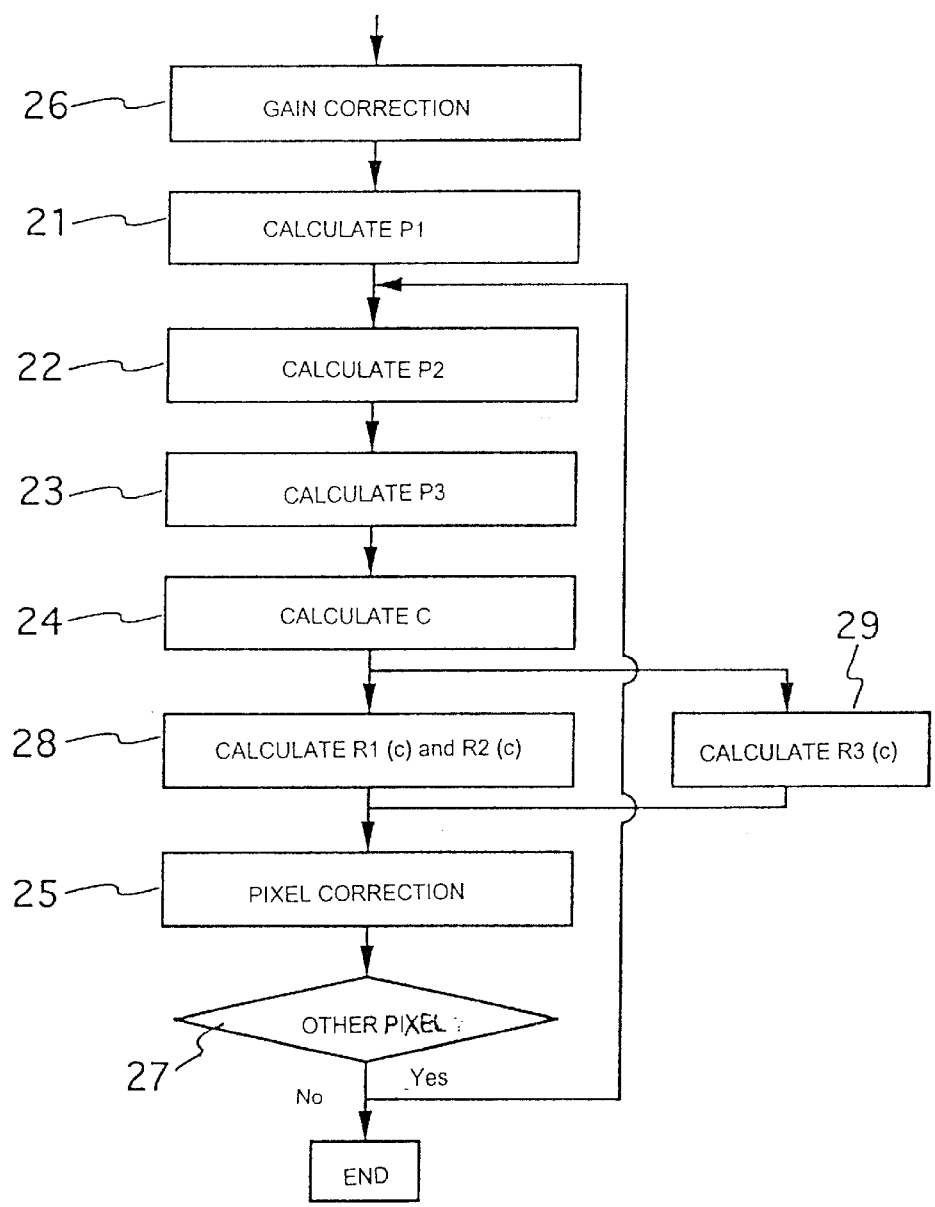
Figure 3:
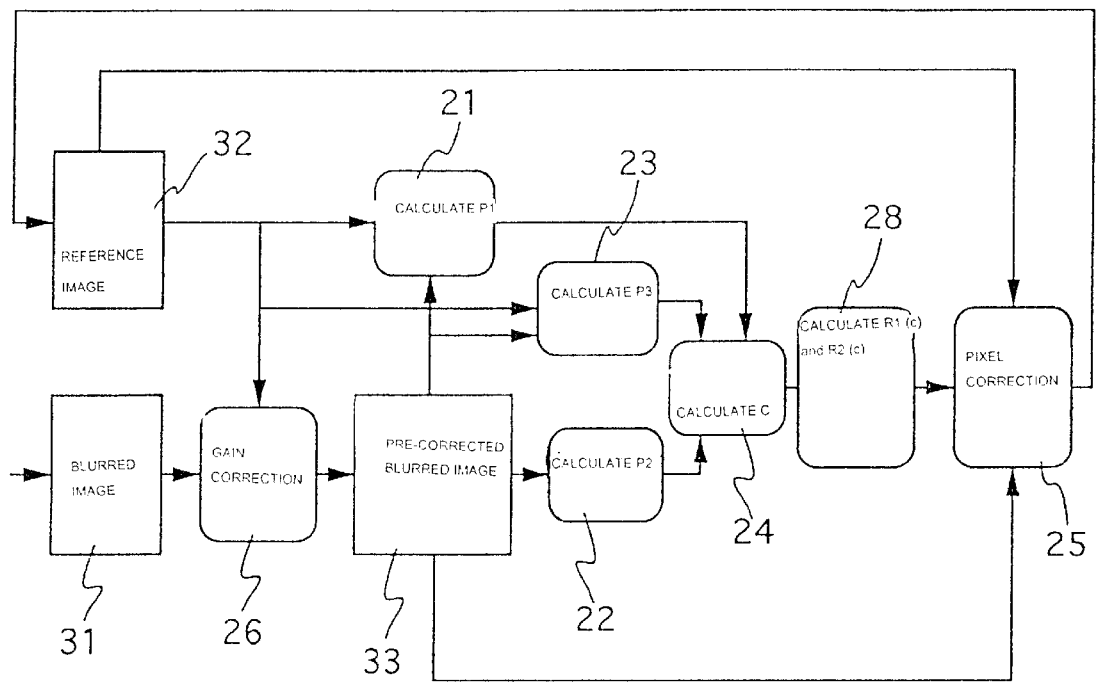
Figures 4A, 4B:
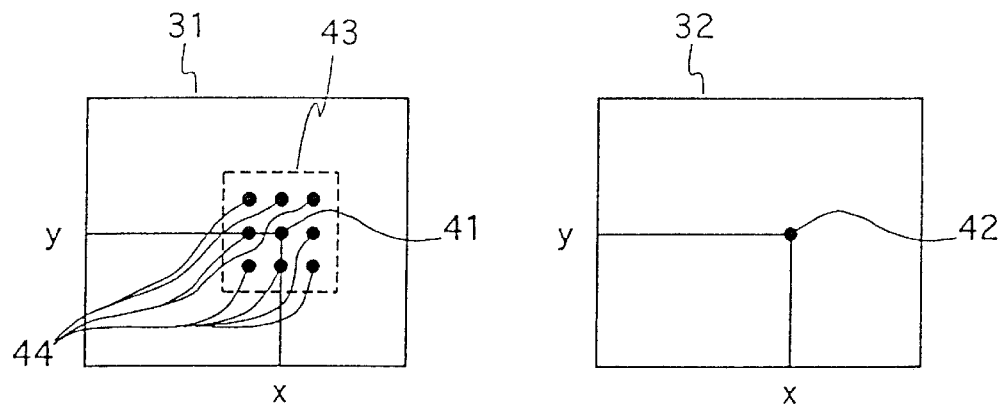
Figure 5:
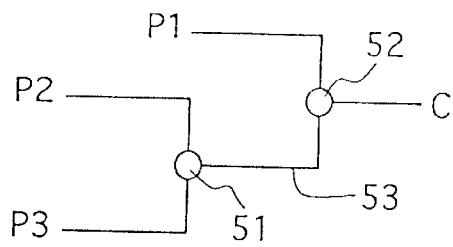
Figure 6:
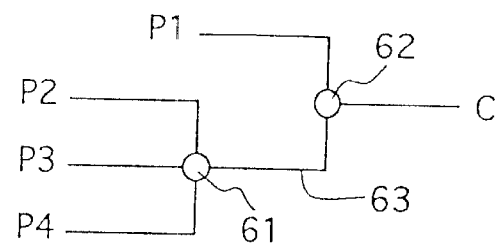
Figure 7:
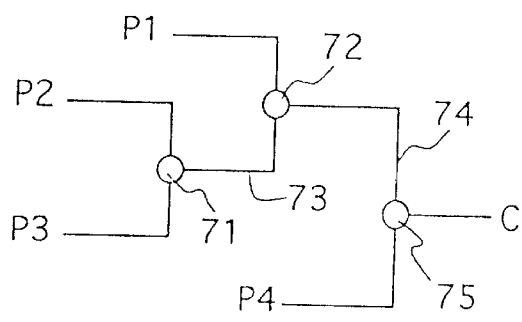
Figure 9:
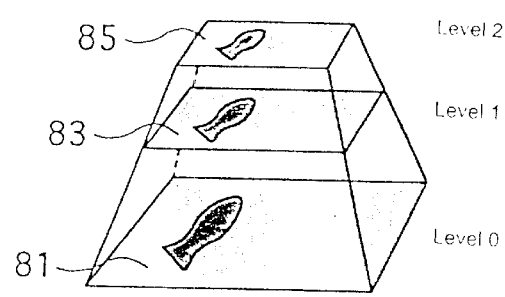
Figure 8:
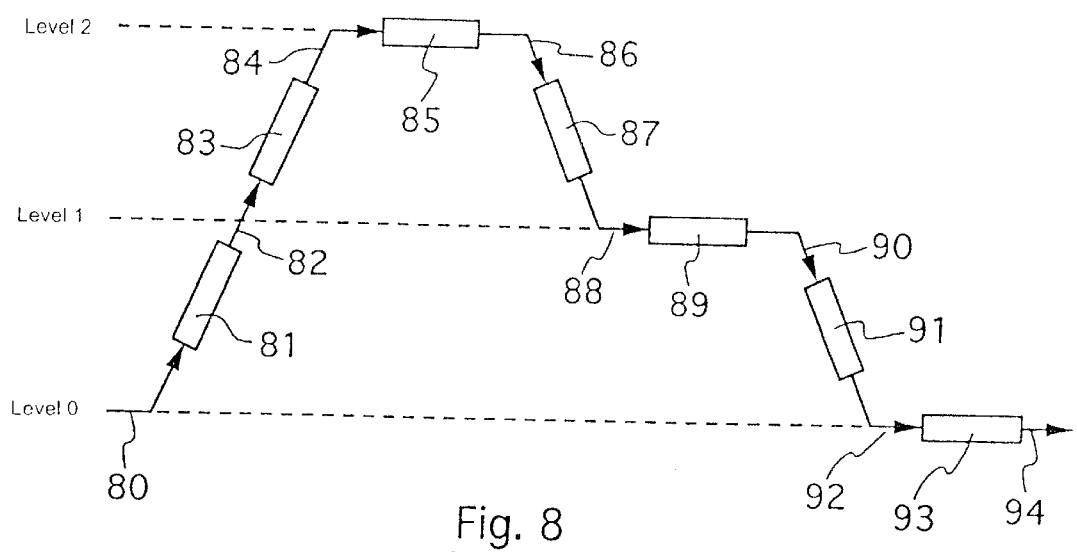

Other characteristics and advantages of the invention will become evident in reading the following description of a preferred embodiment of the invention, given as an example without being in any way restrictive, and the attached drawings in which:

FIG. 1 illustrates the application of the process according to the invention;

FIG. 2 presents a particular embodiment of the process according to the invention;

FIG. 3 illustrates operation of the process in FIG. 2;

FIGS. 4A and 4B schematically present a damaged image and a corresponding reference image, respectively;

FIGS. 5, 6 and 7 each illustrate a distinct embodiment of the calculation of the correction factor for a pixel as a function of the three or four parameters associated with these pixels;

FIG. 8 schematically presents the successive steps in processing each image according to a variant of the process according to the invention, based on hierarchization of the processing; and FIG. 9 illustrates the variant in FIG. 8, presenting an example of images at different processing levels.

Therefore, the invention relates to a process for processing digital images. More precisely, as shown in FIG. 1, the invention is applicable to the processing 1 of a source sequence 2 of damaged digital images, in order to obtain an output sequence 3 of corrected digital images.

In a known manner, the digital images (damaged or corrected) are composed of a large number of pixels each characterized by one of several possible amplitude levels.

For example, an amplitude level for a black and white image means the gray level (usually between 0 and 255). For a colored image, each of the three basic colors can be processed separately. This is equivalent to carrying out black and white type processing for each of the three images associated with a separate color. According to one variant, the amplitude level is equal to the intensity level of the color image.

FIG. 2 shows a specific embodiment of the process according to the invention, and FIG. 3 illustrates this operation.

In one specific embodiment, the process according to the invention includes the following steps for each damaged digital image 31 in the source sequence 2:

calculation (21) of a first parameter P1, called the global parameter, estimating the correction to be made to each of the pixels in the damaged image 31;

calculation (22) of a second parameter P2, called the local parameter, estimating the correction to be made to a given pixel in the damaged image 31;

calculation (23) of a third parameter P3, called the temporal parameter, estimating the correction to be made to a given pixel in the damaged image 31;

calculation (24) of a correction factor C for a given pixel in the damaged image 31, by combining the first, second and third parameters P1, P2, P3, associated with this given pixel;

correction (25) of a given pixel in the damaged image 31, as a function of the correction factor C associated with this given pixel.

The step 21 in which the first parameter P1 is calculated is common to all pixels in the same damaged image 31. However, the subsequent steps 22, 23 and 24 (calculation of the second and third parameters P2, P3, calculation of the correction factor C and correction of the pixel) are repeated for each pixel on the damaged image 31, until all pixels have been processed.

We will now give details of each of these steps 21 to 25.

The step 21 in which the first parameter P1, which is common to all pixels in the damaged image 31, is calculated, is a function of all pixels in a reference image 32. This reference image 32 is the corrected image belonging to the output sequence 3 resulting from the correction to the image previous to the damaged image 31 in the source sequence 2. In other words, the reference image 32 of a damaged image 31 of rank n in source sequence 2 is the result of processing the damaged image of rank n−1 in the same source sequence 2.

In this embodiment, the first parameter P1 is a scalar such that:

$$P1 = K + f_E(H1, H2)$$

where: K is a predetermined offset value;

H1 is a first histogram of amplitude levels of pixels in the damaged image;

H2 is a second histogram of amplitude levels of pixels in the reference image;

$f_E$ is a predetermined error function used to calculate a variation between two functions.

For example, the offset value K could be equal to 1. The error function $f_E$ may for example be a least squares function. In general, $f_E$ (H1, H2) indicates the distance between the first and second histograms H1, H2.

The step 22 in which the second parameter P2 is calculated, which is done for each given pixel in the damaged image 31, is a function of this given pixel and pixels neighboring this given pixel.

FIG. 4A schematically shows the damaged image 31 and illustrates the concept of neighboring pixels. The given pixel to be processed 41 has spatial coordinates (x, y). The pixels 44 in the vicinity of this given pixel 41 are the pixels that are included in a predetermined neighboring area 43 (for example, a window of N pixels by N pixels centered on a given pixel 41).

In this embodiment, the calculation 22 of the second parameter P2 is done at the same time for all pixels in the damaged image (31), and is written using the following formula:

$$\{M_{P2}\} = (1/\alpha 2) \cdot (\{I_t\} - F_2\{I_t\})$$

where: $\{M_{P2}\}$ is a matrix of second parameters P2 (each associated with a distinct pixel in the damaged image 31);

$\{I_t\}$ is a matrix of the amplitude values of pixels in the damaged image 31;

$F_2$ is an average or median or low pass filter or any other filter adapted to the noise being processed;

$\alpha_2$ is a first normalization factor (for example equal to the average or the median for an average or median filter $F_2$ respectively.

The step 23 in which the third parameter P3 is calculated is done for each given pixel 41 in the damaged image 31, and is a function of this given pixel 41 and the pixel in the reference image with the same spatial coordinates as this given pixel 41.

FIG. 4B schematically presents the reference image 32 corresponding to the damaged image 31 in FIG. 4A. It shows the pixel 42 with the same spatial coordinates as the given pixel 41 in the damaged image 31.

In this embodiment, the calculation 23 of the third parameter P3 is carried out simultaneously for all pixels in the damaged image 31, and is written using the following formula:

$$\{M_{P3}\} = (1/\alpha_3) \cdot F_3(\{I_t\} - \{I_{t-1}\})$$

where:

$\{M_{P3}\}$ is the matrix of third parameters P3 each associated with a distinct pixel in the damaged image 31;

$\{I_t\}$ is a matrix of the amplitude values of the pixels in the damaged image 31;

$\{I_{t-1}\}$ is a matrix of the amplitude values of pixels in the reference image 32;

$F_3$ is an average or median or low pass filter;

$\alpha_3$ is a second normalization factor (for example equal to the average or the median for an average or median filter $F_3$ respectively).

In a first embodiment shown in FIG. 5, the correction factor C is such that $$C = \max\{I, P1 \cdot fc(P2, P3)\}$$

where:

P1, P2 and P3 are the first, second and third parameters normalized to 1;

fc is a predetermined combination function (for example a weighted average).

The parameters P2 and P3 are combined (51) for example using a weighted summation, and the result of this combination 53 is multiplied (52) by the first parameter P1, in order to obtain the correction factor C.

A second and a third method of calculating the correction factor C will now be explained with reference to FIGS. 6 and 7. These two variants require that a fourth parameter P4 should be calculated to estimate the correction to be made to each given pixel 41 in the damaged image 31.

This fourth parameter P4 is a probability of error on the amplitude value of the given pixel 41, as a function of the variation E between the number of pixels in the damaged image 31 and the number of pixels in the reference image with the same amplitude value as the given pixel 41. For example, the variation E is written $$\sqrt{|H1(n) - H2(n)|}$$

where: H1 and H2 are histograms of amplitude levels of pixels in the damaged image 31 and the reference image 32, respectively;

n is the amplitude value of the given pixel 41.

In the second method of calculating the correction factor C (see FIG. 6), the second, third and fourth parameters P2, P3 and P4 are combined (61), for example by a weighted summation, and the result of this combination 63 is multiplied (62) by the first parameter P1, in order to obtain the correction factor C.

In the third method of calculating the correction factor C (see FIG. 7), parameters P2 and P3 are combined (71), for example by a weighted summation, and the result of this combination 73 is multiplied (72) by the first parameter P1.

The result of this multiplication 74 is combined with or multiplied by (75) the fourth parameter P4, in order to obtain the correction factor C.

The correction step 25 on a given pixel 41 in the damaged image 31 is made according to a predetermined correction strategy, as a function of the correction factor C associated with this given pixel 41. The corrected image corresponding to the damaged image 31 is obtained after all pixels in this damaged image have been corrected. Note that this corrected image will act as a reference image for processing the next damaged image in the source sequence 2.

A first embodiment of the predetermined correction strategy consists of calculating an amplitude value of the corrected pixel $I_t'$ (x, y) using the following formula for each given pixel 41 in the damaged image 31:

$$I_t'(x, y) = R_1(C) \cdot I_t(x, y) + R_2(C) \cdot I_{t-1}(x, y):$$

where: $I_t$ (x, y) is the amplitude value of the given pixel 41 in the damaged image 31;

$I_{t-1}$ (x, y) is the amplitude value of pixel 42 in the reference image 32 with the same spatial coordinates (x, y) as the given pixel 41;

C is the correction factor, normalized to 1;

$R_1$ and $R_2$ are distribution functions.

The distribution functions $R_1$ and $R_2$ must respect a number of constraints, namely:

$R_1(C)+R_2(C) \leq 1$, $R_1$ is a decreasing function such that $R_1(0)=1$.

$R_2$ is an increasing function such that $R_2(1)=1$.

The two parameters $R_1(C)$ and $R_2(C)$ may for example be calculated in a specific step 28 carried out after the correction factor C has been calculated.

The constraint $R_1(0)=1$ guarantees that when C=0, the amplitude value of the corrected pixel is equal to the amplitude value of the pixel in the damaged image (no replacement). Similarly, the constraint $R_2(1)=1$ guarantees that when C=1, the amplitude value of the corrected pixel is equal to the amplitude value of the pixel in the reference image (complete replacement). Between these two extreme cases, in other words if 0<C<1, the amplitude value of the corrected pixel is equal to a weighted sum of the amplitude values of the pixel in the damaged image and the pixel in the reference image (weighted replacement).

In other words, the given pixel 41 in the damaged image 31 is replaced by the corresponding pixel 42 in the reference image 32, in proportion to the noise that it is supposed to represent, the noise being indicated by the correction factor C associated with this given pixel 41.

A second embodiment of the predetermined correction strategy consists of calculating an amplitude value of the corrected pixel $I_1''$ (x, y) using the following formula, for each given pixel 41 in the damaged image 31:

$$I''(x, y) = R_1(C) \cdot I_t(x, y) + R_2(C) \cdot I_{t-1}(x, y) + R_3(C) \cdot I_{t,F}(x, y)$$

where: $I_t(x, y)$ is the amplitude value of the given pixel 41 of the damaged image 31;

$I_{t-1}(x, y)$ is the amplitude value of pixel 42 in the reference image 32 with the same spatial coordinates (x, y) as the given pixel 41;

$I_{t,F}(x, y)$ is the amplitude value of the pixel in a filtered image with the same spatial coordinates (x, y) as the given pixel 41, the filtered image being obtained by an average or median or low pass filter or any other filter adapted to the noise being processed in the damaged image 31;

C is the correction factor, normalized to 1;

$R_1$, $R_2$ and $R_3$ are distribution functions.

The distribution functions must respect a number of constraints, namely:

$R_1(C)+R_2(C)+R_3(C) \leq 1$ $R_1$ is a decreasing function such that $R_1(0)=1$ $R_2$ is an increasing function such that $R_2(1)=1$ For example, the parameter $R_3(C)$ which forms an additional parameter not in the first embodiment presented above, may be calculated in a particular step 29 carried out after the correction factor C has been calculated.

According to this variant, the correction step for each given pixel in the damaged image 31 is carried out as a function of a prefiltered source image, in addition to being a function of the source and reference images.

Optionally, the process according to the invention may include a prior gain correction step 26 (see FIGS. 2 and 3), intended to balance the amplitude values of the pixels in the damaged image 31 with the amplitude values of the pixels in the reference image 32. The precorrected damaged image 33 thus obtained is used to replace the damaged image 31 in all other steps 21 to 25, 25', 28 in the process.

This gain correction step 26 consists of:

calculating the variation between the average values of the first and second histograms H1, H2 of the amplitudes of pixels in the damaged image 31 and the reference image 32 respectively, this variation being expressed in the form of a gain G;

correcting the amplitude values of the pixels in the damaged image 31 as a function of this variation in the average value, by multiplying the amplitude value of each pixel in the damaged image 31 by the inverse of the gain, i.e. G−1.

The process according to the invention is not dependent on the type of noise affecting images in the source sequence 2. It is particularly, but not exclusively, applicable to real time processing of damaged digital images.

We will now describe a variant of the process according to the invention, with reference to FIGS. 8 and 9. FIG. 8 schematically shows the successive steps in processing each image according to this variant, and FIG. 9 illustrates this variant by presenting an example of images at different processing levels.

In this variant, the damaged digital images 31 in the source sequence 2 form level 0 digital images to be corrected 80. The main steps are carried out in sequence for each of these level 0 digital images 80 to be corrected:

reduction 81 of the size of the level 0 digital image to be corrected 80, in order to obtain a level 1 digital image to be corrected 82;

reduction 83 of the size of the level 1 digital image to be corrected 82, in order to obtain a level 2 digital image to be corrected 84;

processing 85 of hierarchical level 2 of the level 2 digital image to be corrected 84, in order to obtain a level 2 corrected digital image 86;

magnification 87 of the level 2 corrected digital image 86, in order to obtain a level 1 corrected digital image 88;

processing 89 of the hierarchical level 1 of the level 1 corrected digital image 88, in order to obtain a doubly corrected level 1 digital image 90;

magnification 91 of the level 1 doubly corrected digital image 90, in order to obtain a level 0 doubly corrected digital image 92;

processing 93 of hierarchical level 0 of the level 0 doubly corrected digital image 92, in order to obtain a level 0 digital image 94 corrected three times.

With reference to the beginning of this description, this level 0 digital image 94 corrected three times forms the corrected digital image of the output sequence 3 corresponding to the damaged digital image 31 in the source sequence 2.

According to the invention, at least one of the processing steps 85, 89, 93 carried out at a given hierarchical level (level 2, 1 or 0 respectively), consists of using the basic steps presented above with reference to FIGS. 1 to 7 at least once (namely the steps to calculate the various parameters P1, P2, P3, P4 and the correction factor C, and then the correction itself).

In other words, for each hierarchical level (level 2, 1 or 0), the processing 85, 89, 93 may consist of carrying out the above mentioned basic steps once or several times, and/or applying one or more filters (for example average, median or low pass filters).

Some or all of the parameters P1, P2, P3, P4 may be weighted as a function of the hierarchical processing level (level 2, 1 or 0), 85, 89, 93 that at least partially form the basic steps.

Thus, in order to maintain the movement of large objects, it is preferable that the effect of some parameters (for example the temporal parameter P3) should be reduced, and/or the effect of other parameters (for example the local parameter P2) should be given priority when processing the upper levels.

It is obvious that this variant of the invention is not limited to the two hierarchized processing levels, but is more generally applicable in all cases in which there are at least two processing levels. For each additional processing level, simply reiterate:

in the direction of increasing hierarchical levels, the size reduction steps 81, 83, and in the direction of decreasing hierarchical levels, processing steps 85, 89 and 93, and magnification steps 87, 91.

What is claimed is:

1. Process for processing a source sequence of damaged digital images, of the type capable of obtaining an output sequence of corrected digital images, each of the damaged or corrected digital images being described pixel by pixel, each of the said pixels being characterized by an amplitude level among a plurality of possible amplitude levels, characterized by the fact that the said process includes the following main basic steps, for each damaged digital image in the said source sequence:

for all pixels in the damaged image, calculation of a first parameter (P1) called the global parameter, estimating the correction to be made to each pixel in the damaged image as a function of the said set of pixels in the damaged image and the set of pixels in a reference image, the said reference image being a corrected image resulting from the correction of the image preceding the said damaged image in the said source sequence;

for each given pixel in the damaged image, calculation of a second parameter (P2) called the local parameter, estimating the correction to be made to the said given pixel as a function of the given pixel and other pixels called neighboring pixels, located within a predetermined vicinity of the said given pixel;

for each given pixel in the damaged image, calculation of a third parameter (P3) called the temporal parameter, estimating the correction to be made to the said given pixel as a function of the said given pixel and the pixel in the reference image with the same spatial coordinates (x,y) as the said given pixel;

for each given pixel in a damaged image, calculation of a correction factor (C) by combining the said first, second and third estimating parameters (P1, P2, P3) associated with the said given pixel;

correction of each given pixel in the damaged image using a predetermined correction strategy, in order to obtain the pixel corresponding to the corrected image in the output sequence as a function of the correction factor (C) associated with the said given pixel, the given pixel in the damaged image and the pixel in the reference image having the same spatial coordinates (x,y) as the said given pixel.

2. Process according to claim 1, characterized by the fact that the said calculation of the first parameter (P1) for all pixels in the damaged image can be made using the formula:

$$P1 = K + f_E(H1, H2)$$

where: K is a predetermined offset value;

H1 is a first histogram of the amplitudes of pixels in the damaged image;

H2 is a second histogram of amplitude levels of pixels in the reference image;

$f_E$ is a predetermined error function used to calculate a variation between two functions.

3. Process according to claim 1, characterized by the fact that the said predetermined correction strategy consists of calculating an amplitude value of the corrected pixel $I_t'$ (x, y), for each given pixel in the damaged image, using the following formula:

$$I_t'(x, y) = R_1(C) \cdot I_t(x, y) + R_2(C) \cdot I_{t-1}(x, y)$$

where: $I_t(x, y)$ is the amplitude value of the given pixel in the damaged image;

$I_{t-1}(x, y)$ is the amplitude of the pixel in the reference image with the same spatial coordinates (x, y) as the given pixel;

C is the correction factor normalized to 1;

$R_1$ and $R_2$ are distribution functions respecting two constraints, namely:

$R_1(C) + R_2(C) \leq 1$, where $R_1$ is a decreasing function such that $R_{10}(0) = 1$, and $R_2$ is an increasing function such that $R_2(1) = 1$.

4. Process according to claim 1, characterized by the fact that the said predetermined correction strategy consists of calculating an amplitude value of the corrected pixel $I_t''$(x, y), for each given pixel in the damaged image, using the following formula:

$$It''(x, y) = R_1(C) \cdot I_t(x, y) + R_2(C) \cdot I_{t-1}(x, y) + R_3(C) \cdot I_{t,F}(X, y)$$

where: $I_t''$ (x, y) is the amplitude of the given pixel in the damaged image;

$I_{t-1}(x, y)$ is the amplitude value of the pixel in the reference image with the same spatial coordinates (x, y) as the given pixel;

$I_{t,F}(x, y)$ is the amplitude value of the pixel in a filtered image with the same spatial coordinates (x, y) as the given pixel, the said filtered image being obtained by predetermined filtering of the damaged image;

C is the correction factor normalized to 1;

$R_1$, $R_2$ and $R_3$ are distribution functions respecting the constraints $R_1(C) + R_2(C) + R_3(C) \leq 1$, where $R_1$ is a decreasing function such that R (0)=1, and $R_2$ is an increasing function such that $R_2(1) = 1$.

5. Process according to claim 1, characterized by the fact that it includes the following additional basic steps for each given pixel in the damaged image:

calculate an error probability on the amplitude value of the given pixel, as a function of the variation between the number of pixels in the damaged image (H1(n)) and the number of pixels in the reference image (H2(n)) with the same amplitude (n) as the said given pixel, the said error probability consisting of a fourth parameter (P4) estimating the correction to be made to the said given pixel;

use of the said fourth parameter (P4) for weighting of the first and second parameters (P1, P2) or the correction factor (C) associated with the said given pixel.

6. Process according to claim 1, characterized by the fact that it comprises the following preliminary basic steps:

calculate a first histogram (H1) of the amplitudes of pixels in the damaged image;

calculate a second histogram (H2) of the amplitudes of pixels in the reference image;

calculate the variation between the average values of the said first and second histograms, correct the amplitude values of the pixels in the damaged image as a function of the said variation of the average value, in order to balance the amplitude values of the pixels in the damaged image with the amplitude values of the pixels in the reference image and obtain a precorrected damaged image that is used instead of the damaged image in all the other steps of the said process.

7. Process according to claim 1, consisting of carrying out the following steps in sequence for each level n damaged digital image in the source sequence:

reduction in the size of the level n digital image to be corrected, in order to obtain a level n+k digital image to be corrected, where $k \geq 1$;

processing of the level n+k digital image to be corrected at hierarchical level n+k, in order to obtain a corrected level n+k digital image;

increase the size of the corrected level n+k digital image in order to obtain a corrected level n+k−1 digital image;

reiterate the two previous steps of processing and increasing the size, if necessary, until a level n corrected digital image is obtained;

if necessary, processing of the corrected level n digital image at hierarchical level n, characterized by the fact that at least one of the said processing steps at a given hierarchical level consists of using the said basic steps at least once.

8. Process according to claim 7, characterized by the fact that at least one of the said first, second, third and fourth parameters (P1, P2, P3, P4) is weighted as a function of the hierarchical processing level that is formed at least partially by the said basic steps.

9. Process according to claim 1, characterized by the fact that the said calculation of the second parameter (P2) is done simultaneously for all pixels in the damaged image, and is made using the following formula:

$$\{M_{P2}\}=(1/\alpha_2)\cdot(\{I_t\}-F_2\{I_t\})$$

where: $\{M_{P2}\}$ is a matrix of second parameters P2 each associated with a distinct pixel of the damaged image;

$\{I_t\}$ is a matrix of the amplitude values of pixels in the damaged image;

$F_2$ is a predetermined filter;

$\alpha_2$ is a first normalization factor.

10. Process according to claim 1, characterized by the fact that the said calculation of the third parameter (P3) is done simultaneously for all pixels in the damaged image, and is made using the following formula:

$$\{M_{P3}\}=(1/\alpha_3)\cdot F_3(\{I_t\}-\{I_{t-1}\})$$

where: $\{M_{P3}\}$ is a matrix of third parameters P3 each associated with a distinct pixel of the damaged image;

$\{I_t\}$ is a matrix of the amplitude values of pixels in the damaged image;

$\{I_{t-1}\}$ is a matrix of the amplitude values of pixels in the reference image;

$F_3$ is an average or median or low pass filter;

$\alpha_3$ is a second normalization factor.

11. Process according to claim 1, characterized by the fact that the said calculation of the correction factor (C) will be made using the following formula:

$$C=\max\{I, P1\cdot f_c(P2, P3)\}$$

where: P1, P2 and P3 are the said first, second and third parameters normalized to 1;

$f_c$ is a predetermined combination function.

\* \* \* \* \*